United States Patent [19]
Whitten

[11] 3,894,096
[45] July 8, 1975

[54] SEPARATION OF PARA-NITRATED PHENOLIC COMPOUNDS FROM CRUDE REACTION MIXTURES CONTAINING ORTHO-AND PARA-NITRATED PHENOLIC COMPOUNDS

[75] Inventor: Harvey Wade Whitten, Somerville, N.J.

[73] Assignee: American Cyanamid Company, Stamford, Conn.

[22] Filed: Apr. 12, 1974

[21] Appl. No.: 460,415

Related U.S. Application Data
[63] Continuation-in-part of Ser. No. 205,750, Dec. 7, 1971, Pat. No. 3,761,393.

[52] U.S. Cl....... 260/622 R; 260/627 G; 260/621 A
[51] Int. Cl............................................. C07c 79/24
[58] Field of Search ........ 260/622 R, 622 P, 624 A, 260/627 G

[56] References Cited
UNITED STATES PATENTS

| | | | |
|---|---|---|---|
| 2,245,945 | 6/1941 | Dijck | 260/575 |
| 3,248,431 | 4/1966 | Kaeding | 260/622 R |
| 3,510,527 | 5/1970 | Prosser | 260/622 R |
| 3,668,261 | 6/1972 | Harvey et al. | 260/622 R |

FOREIGN PATENTS OR APPLICATIONS

| | | | |
|---|---|---|---|
| 479,765 | 2/1938 | United Kingdom | 260/622 R |
| 573,768 | 4/1959 | Canada | 260/622 R |
| 1,165,637 | 10/1969 | United Kingdom | 260/622 R |

*Primary Examiner*—Bernard Helfin
*Assistant Examiner*—W. B. Lone
*Attorney, Agent, or Firm*—John L. Sullivan

[57] ABSTRACT

Para-nitrophenol or para-nitro-m-cresol is recovered in a highly purified state from a nitration reaction mixture containing para and ortho isomers of nitrophenol or nitro-m-cresol, the major proportion of said isomers being the para isomer, along with water and tar impurities, by a process comprising the steps of (1) heating the mixture in the presence of toluene to extract the para and ortho isomers into the toluene, (2) removing the water, (3) separating insoluble tars from the resulting hot toluene solution of the isomers, (4) cooling the toluene solution to 20°–30°C. to precipitate the para isomer therefrom, (5) washing the precipitate with a small amount of fresh toluene to remove mother liquor therefrom and (6) drying the precipitate.

4 Claims, No Drawings

SEPARATION OF PARA-NITRATED PHENOLIC COMPOUNDS FROM CRUDE REACTION MIXTURES CONTAINING ORTHO-AND PARA-NITRATED PHENOLIC COMPOUNDS

This application is a continuation in part of application Ser. No. 205,750, filed Dec. 7, 1971, now patent No. 3,761,393.

This invention relates to a process for the recovery of para-nitrophenol or para-nitro-m-cresol in a high state of purity from the nitration product mixtures containing the same.

As is well known, a problem encountered in the production of para-nitrophenol (or p-nitro-m-cresol) by the nitration of phenol (or m-cresol) is that of effectively separating the para-nitro product from the ortho-nitro isomer which is also produced to a significant extent in the nitration. Besides the ortho isomer product, the nitration mixture also contains significant amounts of tar impurities and water. The recovery of the para isomer in a high state of purity from the nitration reaction mixture, therefore, requires not only the separation of the ortho isomer but the substantially complete removal of the tar impurities and water. Although various techniques, such as steam distillation, vacuum distillation and solvent extraction, have been tried to effect such a recovery, none, to date, have been completely successful.

Thus, in the case of steam distillation, when it is attempted to distill the ortho-isomer overhead, some of the para-isomer also distills over. In order to obtain a low ortho-isomer content in the distillation residue, therefore, more steam must be used and, as a consequence, more of the para isomer is distilled. Effective separation by this means requires either a difficultly controllable reflux system or a second stage for recovering the para-isomer from the orthoisomer. In addition, tar impurities are not removed from the crude para-isomer by steam distillation and the amount of color tends to increase by the use of this technique.

Vacuum distillation of the nitration mixture effectively removes the ortho-isomer. However, in this case, the tars present in the nitration mixture remain and the tar content of the para-isomer tends to increase, resulting in a badly colored product.

Selective solvent extraction of the para isomer from the nitration mixture is likewise not sufficient. Thus, while it may separate the two major isomers, it does not separate all of the impurities from the para-isomer and, therefore, does not provide the para isomer in a state of highest purity and color.

There is a need, therefore, for a procedure whereby para-nitrophenol or para-nitro-m-cresol can be isolated in a high state of purity from the crude nitration mixtures. The present invention provides such a process.

Thus, in accordance with the present invention, paranitrophenol or para-nitro-m-cresol of high purity (99+%) is recovered from a nitration reaction mixture containing the same, together with the ortho-nitro isomer thereof, as well as tar impurities and water by a process involving the following steps (1) mixing the reaction mixture with toluene in a proportion of at least about 2 parts, and preferably from about 2 to about 6 parts, by weight, of toluene per part of the reaction mixture, (2) heating the mixture formed in step 1 to a temperature of 84°C. to extract the para and ortho isomers into the toluene, (3) further heating the mixture from step 2 at about 84°C. under reflux conditions to azeotropically distill off the water, (4) removing the insoluble tars from the hot mixture from step 3 by permitting the mixture to settle and separating the settled tars therefrom by conventional means, such as withdrawal of the tars from the hot toluene solution or decantation of the hot solution from the tars, thus leaving a hot toluene solution of the para and ortho isomers, (5) cooling the said solution to a temperature of about 20° to 30°C. to precipitate the para isomer therefrom, (6) washing the precipitate with a small amount of fresh toluene to remove mother liquor therefrom and (7) drying the precipitate.

While the water is preferably removed in step 3 of the process of azeotropic distillation, when the nitration mixture results from the nitration of meta cresol, the water may also effectively be removed by decantation from the hot toluene solution of the isomers simultaneously with the insoluble tars. Besides toluene, other solvents, such as benzene and cyclohexane may be used in the process. However, they are somewhat less effective than toluene, which is preferred.

The para nitrophenol or para nitro-m-cresol isomer obtained by the process of the invention is of high purity (99+%), but may contain some undesirable color bodies which may be effectively removed by distillation of the isomers in vacuo by conventional means.

Thus, for example, the dried precipitate composed practically entirely of para-nitrophenol or para-nitro-m-cresol may then be melted at about 115°–135°C. or 135°–150°C., respectively, and preferably continuously distilled, maintaining as short a residence time as practicable in view of the heat sensitivity of the compounds. The distillation is normally conducted at a pressure of from about 2 to 4 mm Hg at a temperature sufficient to distill para-nitrophenol at about 150°C., and para-nitro-m-cresol at about 160°C.

The type of distillation apparatus used is not critical. A rotary, thin-film evaporator, such as the LUWA Thin-Film Evaporator (Luwa Corp., Charlotte, North Carolina, Type L-82/500/14) is the preferred equipment.

The invention is more fully described in the examples which follow.

EXAMPLE 1

Extraction of Crude Nitrophenols and Selective Crystallization

To a suitable vessel containing 1 liter of toluene was added 397 grams of a crude nitration reaction mixture, resulting from the nitration of nitrophenol, containing 337 grams of para-nitrophenol, 29.4 grams orthonitrophenol and 31.6 grams of water and tar. The mixture was heated to reflux and the water azeotropically distilled overhead (16 ml.). The hot toluene solution was then allowed to settle, the toluene solution decanted from the tars (15 grams) and cooled to 25°C. to preferentially precipitate the para-nitrophenol. After filtration of the product and drying, there was obtained 312.0 grams of para-nitrophenol containing less than 0.1% ortho-nitrophenol. Recovery of para compound was 92.6%. The product was reddish-brown.

This example illustrates the high degree of separation of the ortho- and para-isomers. However, even with the excellent separation, the color of the desired para-isomer is unsatisfactory for some purposes.

EXAMPLE 2

Steam Stripping of Crude Nitrophenols

To a Rodney Hunt No. 0 Laboratory model "Turbo-Film" processor was fed a crude nitration reaction mixture containing 75.2% para-nitrophenol, 7.1% ortho-nitrophenol, 16.0% water, and 1.7% tar at a rate of 36 pounds/hour with a steam:feed ration of 0.8. A total of 24.0 pounds of the mixture containing 18.0 pounds of para-nitrophenol, 1.7 pounds of ortho-nitro-phenol, 3.8 pounds of water and 0.4 pounds of tar was stripped to give the following:

OVERHEAD 18.9 pounds water (94.0%)
1.0 pounds ortho-nitrophenol (5.0%)
0.2 pounds para-nitrophenol (1.0%)

BOTTOMS 17.6 pounds para-nitrophenol (93.1%)
0.4 pounds ortho-nitrophenol (1.9%)
0.1 pounds dinitrophenol (0.7%)
0.8 pounds tar (4.3%)
Total Para-Isomer Accountable = 98.9%
Para-Nitrophenol Recovery = 97.8%

The product (bottoms) was brownish-black to black. This Example shows the much lower purity of the para-nitrophenol obtained by steam stripping as compared with the solvent extraction and selective crystallization process of Example 1.

EXAMPLE 3

Vacuum Distillation of Para-Nitrophenol

The products from Examples 1 and 2, respectively, were subjected to vacuum distillation as follows. In each case, the molten product was fed to 1.4 sq. ft. LUWA Thin-Film Evaporator, fitted with clearance blades and a 6 mm residence time ring by means of a pump. The Evaporator was heated by Dowtherm fluid circulating from a heating system through the jacket and the overhead vapors were condensed against steam. When steady state conditions were obtained, the rotor was run at maximum speed and the nitro-phenol (or nitro-cresol) pumped in at a rate consistent with the desired ratio of overhead vapor to residence time. The following table shows the results obtained in the two distillations.

|  | Distillate:analysis | Residue:analysis |
|---|---|---|
| Example 2 (Steam dist.) | 80% : 0.37% ortho 1.9% dinitrophenol | 20% : 80% para |
| Example 1 (Extracted) | 80% : pure para | 20% : 95% para |

This example illustrates the improved separation and high purity of the para-nitrophenol after distillation when the isomers are separated as in Example 1.

EXAMPLE 4

Solvent Extraction and Selective Crystallization of Crude Nitro-m-Cresols

To 300 pounds of toluene was added 100 pounds of crude nitro-m-cresols containing 35.2% para isomer, 4.2% other isomers, 40.3% water and tars. This was heated to 85°C. to effect solution of the nitro-m-cresol isomer products. The aqueous portion and insoluble tars were allowed to settle and were withdrawn. The toluene solution was then cooled to 20°C. to precipitate the para isomer which was filtered, washed with fresh solvent and dried. The solvent was recycled and the procedure repeated five times, representing the purification of 536.7 pounds of crude nitro-m-cresols. The results were as follows:

| | |
|---|---|
| Total para isomer in crude charged (lbs.) | 296.1 |
| Total para isomer recovered (lbs.) | 280.3 |
| % Para isomer recovered | 94.7 |

A vapor phase chromatograph of the isolated product showed the complete absence of meta cresol, ortho nitro-m-cresols or other higher boiling products. The product was tan colored.

EXAMPLE 5

Steam Stripping of Crude Nitro-m-Cresols

A suitable distillation apparatus was charged with 942 grams of a crude nitration reaction mixture, resulting from the nitration of m-cresol, containing 65.2% p-nitro-m-cresol, 5.2% ortho-isomer, and 29.6% water and tars. One liter of water was added to the mixture and the contents brought to the boil. Steam was added by means of a steam inlet tube below the surface. A total of 29.6 g. of ortho-nitro-m-cresol distilled overhead. The residue was cooled to 25°C. and filtered. There was obtained 570 grams (93%) of residue which contained 95.4% para isomer, 0.9% other isomers and 3.7% tars. The product was dark brown. This example shows the inadequate separation of the ortho-isomer and tar impurities from the para-isomer by steam-stripping.

EXAMPLE 6

Vacuum Distillation of Para-Nitro-m-Cresol

To a suitable distillation apparatus there was 4. 139.4 grams of toluene-recrystallized para-nitro-m-cresol from Example 4. This was distilled in vacuo and the liquid level maintained by the addition of additional para nitro-m-cresol via an addition funnel. The distillation was conducted at a distillate temperature of 154°C. and a pressure of 3 mm Hg. Analysis of the product (orange-yellow) showed ho isomers to be present in the para nitro-m-cresol. A total of 899.1 grams was collected of 942.7 grams distilled or 95.4%. An additional 27.2 grams or 2.9% was accounted for in the residue for a total accountability of 98.3%.

This example illustrates the excellent separation and high quality product which results when the para isomer is extracted from the crude nitration mixture and selectively crystallized in accordance with this invention.

EXAMPLE 7

Vacuum Distillation of Steam-Stripped Para-Nitro-m-Cresol

To a suitable distillation apparatus was charged 100 grams of steam stripped para nitro-m-cresol of Example 5. The compound was distilled in vacuo at 146°–150°C. and 0.7 mm Hg. After 15 minutes, the temperature spontaneously increased from 169° to 180°C. (in distillation flask) and from 150° to 155°C.

head temperature. The material in the distillation flask decomposed, and fumes and a reddish condensate began to collect in the distillation receiver. The distillation was stopped. Up to this point 87.7 grams of distillate had been collected; 8.6 grams remained in the distillation flask as tars. The distillate was analyzed as follows:

| | |
|---|---|
| p-nitro-m-cresol | 9.2% |
| 6-nitro-m-cresol | trace |
| tars, high boiling material | balance of mixture |

This experiment illustrates the poor recovery and purity of the p-nitro-m-cresol obtained by vacuum distillation of steam-stripped nitro-m-cresol isomers of Example 5 as compared with the vacuum distillation of the product of Example 4, obtained by solvent extraction and selective crystallization in accordance with this invention.

I claim:

1. A process for recovering the para-nitrated phenolic product isomer in highly purified form from a crude reaction mixture resulting from the nitration of phenol or m-cresol, said mixture containing both para- and ortho-nitrated phenolic product isomers with the major proportion of said isomers being the para isomer, along with water and tar impurities, comprising the steps of (1) mixing the reaction mixture with toluene in a proportion of at least about 2 parts by weight of toluene per part of the reaction mixture, (2) heating the mixture formed in step 1 to a temperature of about 84°C. to extract the para and ortho isomers into the toluene, (3) further heating the mixture from step 2 at about 84°C. under reflux conditions to azeotropically distill off the water, (4) removing the insoluble tars from the hot mixture from step 3 by permitting the mixture to settle and separating the settled tars therefrom, (5) cooling the hot toluene solution from step 4 to a temperature of about 20° to 30° C. to precipitate the para isomer therefrom, (6) washing the precipitate with a small amount of fresh toluene to remove mother liquor therefrom and (7) drying the precipitate.

2. The process of claim 1 wherein the proportion of toluene used is from about 2 to about 6 parts per part of the reaction mixture.

3. The process of claim 1 wherein the reaction mixture is that resulting from the nitration of phenol and the para-nitrated product is para-nitrophenol.

4. The process of claim 1 wherein the reaction is that resulting from the nitration of meta-cresol and the paranitrated product is para-nitro-m-cresol.

* * * * *